(12) United States Patent
Carter et al.

(10) Patent No.: US 9,026,583 B2
(45) Date of Patent: *May 5, 2015

(54) METHOD AND APPARATUS FOR POLYMORPHIC SERIALIZATION

(75) Inventors: Wayne Carter, Salt Lake City, UT (US); Sridhar Tadepalli, Foster City, CA (US); Rahim Yaseen, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 301 days.

This patent is subject to a terminal disclaimer.

(21) Appl. No.: 13/235,729

(22) Filed: Sep. 19, 2011

(65) Prior Publication Data

US 2012/0072477 A1 Mar. 22, 2012

Related U.S. Application Data

(60) Provisional application No. 61/384,150, filed on Sep. 17, 2010.

(51) Int. Cl.
| | |
|---|---|
| *G06F 15/16* | (2006.01) |
| *G06F 12/00* | (2006.01) |
| *G06F 17/30* | (2006.01) |
| *H04M 1/725* | (2006.01) |

(52) U.S. Cl.
CPC .... *G06F 17/30905* (2013.01); *G06F 17/30569* (2013.01); *G06F 17/30893* (2013.01); *H04M 1/72583* (2013.01)

(58) Field of Classification Search
CPC ................................................ G06F 17/30569

USPC .......... 709/219, 203, 209; 707/803, 809, 810, 707/811, 755, 756
See application file for complete search history.

(56) References Cited

U.S. PATENT DOCUMENTS

| | | | | |
|---|---|---|---|---|
| 5,572,643 | A | 11/1996 | Judson | 395/793 |
| 6,128,621 | A | 10/2000 | Weisz | 707/103 |

(Continued)

FOREIGN PATENT DOCUMENTS

| | | | | |
|---|---|---|---|---|
| EP | 1 347 397 A2 | 9/2003 | | G06F 17/30 |
| EP | 1 956 481 A2 | 8/2008 | | G06F 9/44 |
| WO | WO 2008/101236 A1 | 8/2008 | | |

OTHER PUBLICATIONS

Cooperman et al, "Marshalgen: Marshaling Objects in the Presence of Polymorphism", Northeastern University, MA IPPS/SPDP pp. 616-1999.*

(Continued)

*Primary Examiner* — Aftab Nsir Khan
(74) *Attorney, Agent, or Firm* — Campbell Stephenson LLP (57) ABSTRACT

Polymorphic serialization is disclosed. In one embodiment polymorphic serialization may include generating a first reply in response to receiving a first request from a first device, the first reply including first content in a first serialization format. The first reply is transmitted to the first device via a first communication link. A second reply may be generated in response to receiving a second request from a second device, the second reply including second content in a second serialization format. The second reply is transmitted to the second device via a second communication link. The first and second devices are distinct from each other, and the first and second serialization formats are distinct from each other.

12 Claims, 7 Drawing Sheets

(56) References Cited

U.S. PATENT DOCUMENTS

| | | |
|---|---|---|
| 6,268,856 B1 | 7/2001 | Bruck et al. ............... 345/357 |
| 6,327,628 B1 | 12/2001 | Anuff et al. ................ 719/311 |
| 6,501,956 B1 | 12/2002 | Weeren et al. .............. 455/463 |
| 6,684,370 B1 | 1/2004 | Sikorsky et al. ............ 715/205 |
| 6,748,569 B1 | 6/2004 | Brooke et al. .............. 715/207 |
| 6,763,343 B1 | 7/2004 | Brooke et al. .............. 717/115 |
| 6,859,820 B1 | 2/2005 | Hauduc et al. .............. 709/203 |
| 6,871,346 B1 | 3/2005 | Kumbalimutt et al. ....... 718/104 |
| 6,925,646 B1 | 8/2005 | Korenshtein ................ 719/328 |
| 6,964,014 B1 | 11/2005 | Parish ......................... 715/205 |
| 6,987,987 B1 | 1/2006 | Vacanti et al. .............. 455/556.2 |
| 7,007,275 B1 | 2/2006 | Hanson et al. ............... 718/101 |
| 7,096,224 B2 | 8/2006 | Murthy et al. ............... 707/100 |
| 7,120,639 B1* | 10/2006 | de Jong et al. .............. 707/694 |
| 7,139,370 B1 | 11/2006 | Tse .............................. 379/88.17 |
| 7,546,602 B2 | 6/2009 | Hejlsberg et al. ............ 719/313 |
| 7,574,486 B1 | 8/2009 | Cheng et al. ................ 709/219 |
| 7,747,782 B2 | 6/2010 | Hunt et al. .................. 709/246 |
| 7,907,966 B1 | 3/2011 | Mammen .................... 455/557 |
| 8,131,875 B1 | 3/2012 | Chen et al. .................. 709/246 |
| 8,191,040 B2 | 5/2012 | Hejlsberg et al. ............ 717/114 |
| 8,386,955 B1 | 2/2013 | Weber et al. ................ 715/781 |
| 2002/0046240 A1 | 4/2002 | Graham et al. .............. 709/203 |
| 2002/0078165 A1 | 6/2002 | Genty et al. ................. 709/217 |
| 2002/0140731 A1* | 10/2002 | Subramaniam et al. ...... 345/762 |
| 2003/0187984 A1 | 10/2003 | Banavar et al. ............. 709/225 |
| 2003/0191685 A1 | 10/2003 | Reese .......................... 705/14 |
| 2004/0110490 A1* | 6/2004 | Steele et al. ................ 455/412.1 |
| 2004/0181467 A1 | 9/2004 | Raiyani et al. ............... 705/28 |
| 2004/0204116 A1 | 10/2004 | Ben-Efraim et al. ....... 455/104.1 |
| 2004/0220946 A1* | 11/2004 | Krishnaprasad et al. ..... 707/100 |
| 2005/0003810 A1 | 1/2005 | Chu et al. .................... 455/418 |
| 2005/0015375 A1* | 1/2005 | Harjanto ..................... 707/10 |
| 2005/0015513 A1 | 1/2005 | Tran ............................ 709/246 |
| 2005/0044197 A1 | 2/2005 | Lai .............................. 709/223 |
| 2005/0060277 A1 | 3/2005 | Zlatanov et al. ............. 707/1 |
| 2005/0091272 A1 | 4/2005 | Smith et al. ................. 707/104.1 |
| 2005/0097526 A1 | 5/2005 | Hauduc et al. .............. 717/136 |
| 2005/0102281 A1 | 5/2005 | Takahashi .................... 707/3 |
| 2005/0188353 A1 | 8/2005 | Hasson et al. ............... 717/116 |
| 2005/0216501 A1 | 9/2005 | Cengiz et al. ............... 707/103 R |
| 2006/0059225 A1 | 3/2006 | Stonehocker et al. ....... 709/202 |
| 2006/0143193 A1* | 6/2006 | Thakkar et al. .............. 707/100 |
| 2006/0173873 A1* | 8/2006 | Prompt et al. ............... 707/100 |
| 2006/0200415 A1 | 9/2006 | Lu ............................... 705/50 |
| 2006/0277271 A1 | 12/2006 | Morse et al. ................. 709/217 |
| 2006/0288280 A1* | 12/2006 | Makela ........................ 715/530 |
| 2007/0061779 A1* | 3/2007 | Dowedeit et al. ............ 717/120 |
| 2007/0078784 A1 | 4/2007 | Donovan et al. ............. 705/71 |
| 2007/0100967 A1* | 5/2007 | Smith et al. ................. 709/219 |
| 2007/0150610 A1 | 6/2007 | Vassilev et al. .............. 709/230 |
| 2007/0174330 A1 | 7/2007 | Fox et al. .................... 707/102 |
| 2007/0208704 A1 | 9/2007 | Ives ............................. 707/3 |
| 2007/0214170 A1 | 9/2007 | Lin .............................. 707/102 |
| 2007/0220158 A1 | 9/2007 | Tolgu et al. .................. 709/229 |
| 2007/0287413 A1 | 12/2007 | Kleitsch et al. ............. 455/405 |
| 2007/0300237 A1 | 12/2007 | Neil et al. .................... 719/319 |
| 2008/0028335 A1 | 1/2008 | Rohrabaugh et al. ........ 715/800 |
| 2008/0040389 A1 | 2/2008 | Seth et al. ................... 707/104.1 |
| 2008/0072139 A1 | 3/2008 | Salinas et al. ............... 715/238 |
| 2008/0098018 A1* | 4/2008 | King et al. .................. 707/101 |
| 2008/0120393 A1 | 5/2008 | Chen et al. .................. 709/217 |
| 2008/0172608 A1 | 7/2008 | Patrawala et al. ............ 715/255 |
| 2008/0183758 A1 | 7/2008 | Kennedy ..................... 707/104.1 |
| 2008/0198156 A1 | 8/2008 | Jou et al. ..................... 345/418 |
| 2008/0222242 A1 | 9/2008 | Weiss et al. ................. 709/203 |
| 2008/0222269 A1 | 9/2008 | Major et al. ................. 709/217 |
| 2008/0228758 A1 | 9/2008 | Aaltonen et al. ............ 707/5 |
| 2008/0281866 A1 | 11/2008 | Claussen et al. ............ 707/103 Y |
| 2008/0288881 A1 | 11/2008 | Aaltonen et al. ............ 715/764 |
| 2009/0003603 A1 | 1/2009 | Wessel et al. ................ 380/255 |
| 2009/0005087 A1 | 1/2009 | Lunati et al. ................ 455/466 |
| 2009/0005122 A1 | 1/2009 | Goldfarb ..................... 455/564 |
| 2009/0006338 A1 | 1/2009 | Ives et al. .................... 707/3 |
| 2009/0070667 A1 | 3/2009 | Zlatanov et al. ............. 715/243 |
| 2009/0083232 A1 | 3/2009 | Ives et al. .................... 707/3 |
| 2009/0094417 A1 | 4/2009 | Carlson et al. .............. 711/137 |
| 2009/0100096 A1 | 4/2009 | Erlichson et al. ............ 707/104.1 |
| 2009/0172101 A1* | 7/2009 | Arthursson .................. 709/205 |
| 2009/0177685 A1 | 7/2009 | Ellis et al. |
| 2009/0193141 A1 | 7/2009 | Suresh ......................... 709/235 |
| 2009/0254611 A1 | 10/2009 | Pena et al. ................... 709/203 |
| 2010/0010671 A1 | 1/2010 | Miyamoto ................... 700/247 |
| 2010/0049984 A1 | 2/2010 | Masushio et al. ............ 713/179 |
| 2010/0083277 A1* | 4/2010 | Malladi et al. .............. 719/313 |
| 2010/0174602 A1 | 7/2010 | Zweben et al. ............. 705/14.41 |
| 2010/0174717 A1 | 7/2010 | Fambon et al. ............. 707/741 |
| 2010/0191777 A1* | 7/2010 | Ylonen ........................ 707/803 |
| 2010/0228880 A1* | 9/2010 | Hunt et al. ................... 709/246 |
| 2010/0235473 A1 | 9/2010 | Koren et al. ................ 709/219 |
| 2010/0262780 A1 | 10/2010 | Mahan et al. ................ 711/118 |
| 2010/0299264 A1 | 11/2010 | Zimmerman et al. ........ 709/226 |
| 2010/0299588 A1 | 11/2010 | Dattilo et al. ................ 715/234 |
| 2010/0332586 A1 | 12/2010 | Jogand-Coulomb et al. . 709/203 |
| 2010/0333153 A1 | 12/2010 | Sahota et al. ................ 725/97 |
| 2012/0047445 A1 | 2/2012 | Rajagopal ................... 715/747 |
| 2012/0071146 A1 | 3/2012 | Shrivastava et al. ........ 455/414.3 |
| 2012/0071155 A1 | 3/2012 | Carter et al. ................ 455/422.1 |
| 2012/0072498 A1 | 3/2012 | Carter et al. ................ 709/204 |
| 2012/0079009 A1 | 3/2012 | Carter et al. ................ 709/203 |
| 2012/0079367 A1 | 3/2012 | Carter et al. ................ 709/201 |
| 2012/0089695 A1 | 4/2012 | Fainberg et al. ............. 709/213 |
| 2012/0124163 A1 | 5/2012 | Carter et al. ................ 709/217 |
| 2012/0151000 A1 | 6/2012 | Snodgrass et al. ........... 709/217 |
| 2013/0007016 A1 | 1/2013 | Saxena ........................ 707/748 |
| 2013/0275854 A1 | 10/2013 | Lim et al. .................... 715/234 |
| 2013/0282986 A1 | 10/2013 | Allen et al. .................. 711/137 |

OTHER PUBLICATIONS

Genest, Aaron et al., Looking Ahead: Comparison of Page Preview Techniques for Goal-Directed Web Navigation, International Federation for Information Processing, 2009, pp. 378-391, (14 pages).

Jones, Robert, "Creating Web Content for Mobile Phone Browsers, Part 1," Feb. 6, 2004; pp. 1-7, (7 pages).

Cioroianu, Andrei, Senior Java Developer and Consultant, Devsphere; "Auto-Save JSF Forms with Ajax, Parts 1, 2, and 3;" Aug. 7, 2007, 40 pages.

* cited by examiner

METHOD AND APPARATUS FOR POLYMORPHIC SERIALIZATION

CROSS-REFERENCE TO RELATED APPLICATIONS

This application claims priority to Provisional Application No. 61/384,150 filed on Sep. 17, 2010, and is incorporated herein in its entirety by reference.

BACKGROUND OF THE INVENTION

Enterprise applications are integral parts of many businesses and provide valuable services to its users. For example, enterprise applications provide customer relationship management (CRM), resource planning, human resource management, etc. The present invention will be described with reference to an example CRM that provides sales and marketing services to its users, it being understood that the present invention should not be limited thereto.

CRM is a widely implemented strategy for managing a company's interaction with customers, clients, and sales prospects. CRM involves technology to organize, automate, and synchronize business processes-principally sales activities, but also those for marketing, customer service, and technical support. The overall goals of CRM are to find, attract, and win new clients, nurture and retain those the company already has, etc.

CRM services can be accessed through mobile devices (e.g., smart phones or tablet computers) in data communication with a data processing system the implements the CRM. The present invention will be described with reference to providing CRM services to users via their mobile devices, it being understood that the present invention should not be limited thereto.

SUMMARY

Polymorphic serialization is disclosed. In one embodiment polymorphic serialization may include a CRM generating a first reply in response to receiving a first request from a first device, the first reply including first content in a first serialization format. The first reply is transmitted to the first device via a first communication link. A second reply may be generated by the CRM in response to receiving a second request from a second device, the second reply including second content in a second serialization format. The second reply is transmitted to the second device via a second communication link. The first and second serialization formats are distinct from each other.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Today's sales and marketing workforce is more mobile than ever. To reduce sales downtime, increase customer face time, and win more deals, many companies now employ mobile CRM to move their business forward while employees are on the road. Mobile CRM enables users to more efficiently use CRM services such accessing, reviewing, and/or updating sales opportunities, contacts, leads, calendar entries, etc., through user interfaces (UIs) or pages displayed on their mobile devices.

Figure 1:
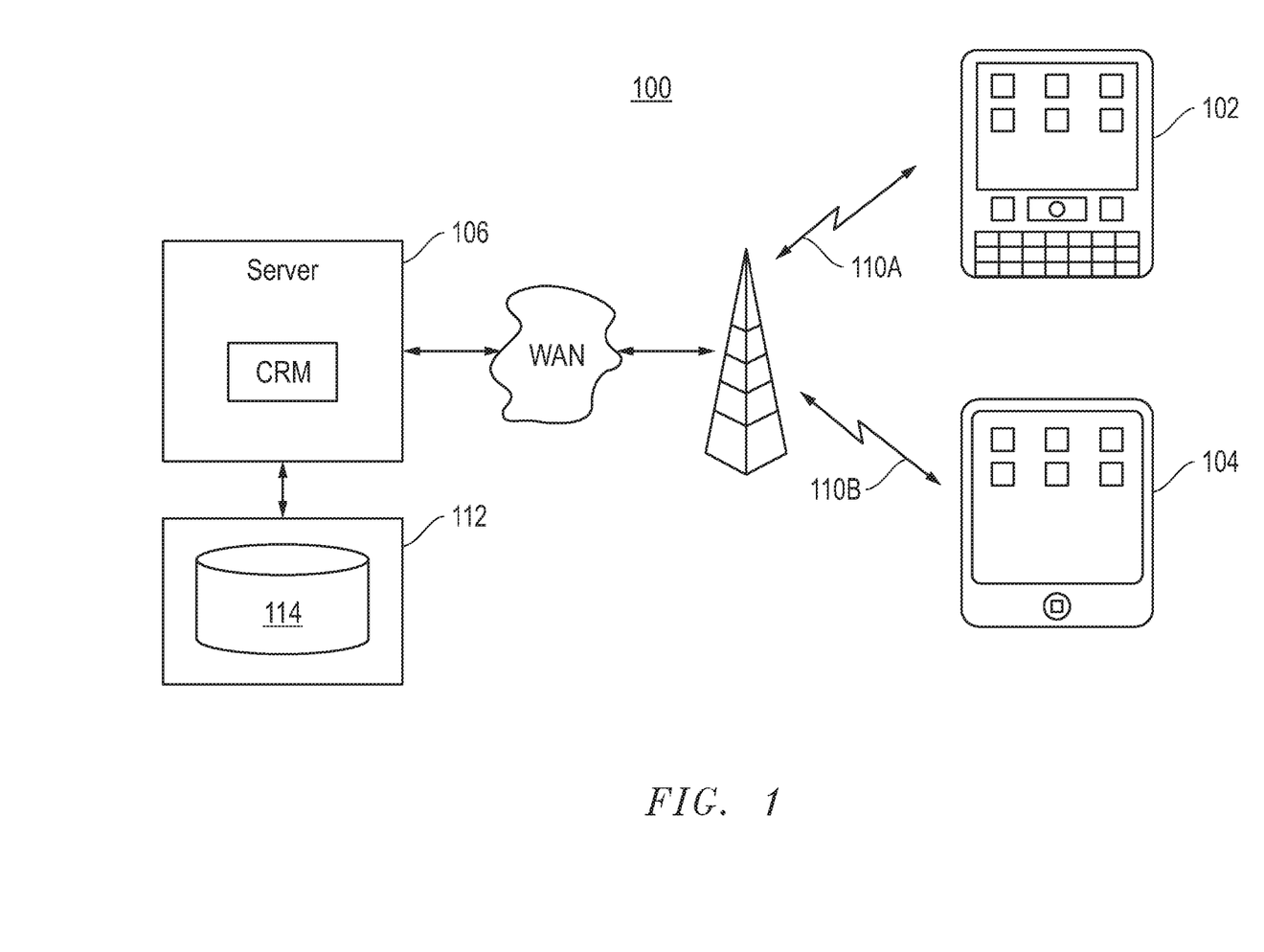
FIG. 1 graphically illustrates relevant components of an example system that employs mobile CRM.

FIG. 1 illustrates in block diagram form, relevant components of an example system 100 that implements mobile CRM in accordance with one embodiment of the present invention. System 100 includes mobile devices (e.g., smart phones) 102 and 104 in wireless communication with a CRM executing on server 106. The CRM is in data communication with a storage system 112 that includes one or more relational databases 114. For purposes of explanation only, storage system 112 is presumed to include a single relational database 114.

Relational database 114 stores data of a logical data model, which in turn consists of business objects. A business object may represent a logical entity that stores a set of instance variables or properties, also known as attributes, and associations with other business objects, thereby weaving a map of objects representing business relationships. A business object may represent a data entity that may contain related data held in many tables of the relational database 114. A business object may be made of business components that map to these tables. A business object is an object type that glues related business components together. A business component is said to provide a layer of wrapping over the tables. Opportunities, accounts, and contacts are examples of business objects.

As will be more fully described below, the CRM of FIG. 1 operates with mobile devices 102 and 104, which are substantially different in design and operation. In other words, the CRM is designed to be mobile device independent. The CRM includes a single, metadata driven application that contains multiple views or page definitions. As will be more fully described, in response to receiving a page request from mobile device 102 or 104, the CRM merges or binds data of a logical data model with a selected page definition, the result of which is serialized and sent to the mobile device 102 or 104. Mobile device 102 or 104 receives the reply, deserializes content contained therein, and subsequently displays a page that includes visual representations of the merged data and other components. Serialization is the process of converting a data structure or object state into a format that can transmitted across a network communication link and "resurrected" later in another device.

The CRM sends each reply in a serialization format that is optimized for the target mobile device. Replies are sent to mobile device 102 with page content serialized in a one format (e.g., JavaScript Object Notation (JSON)), and replies are sent to mobile device 104 with page content serialized in another, different format (e.g., property list (plist)). While the present invention will be described with reference to mobile devices 102 and 104 receiving replies in JSON and plist format, the present invention should not be limited thereto.

Figure 2:
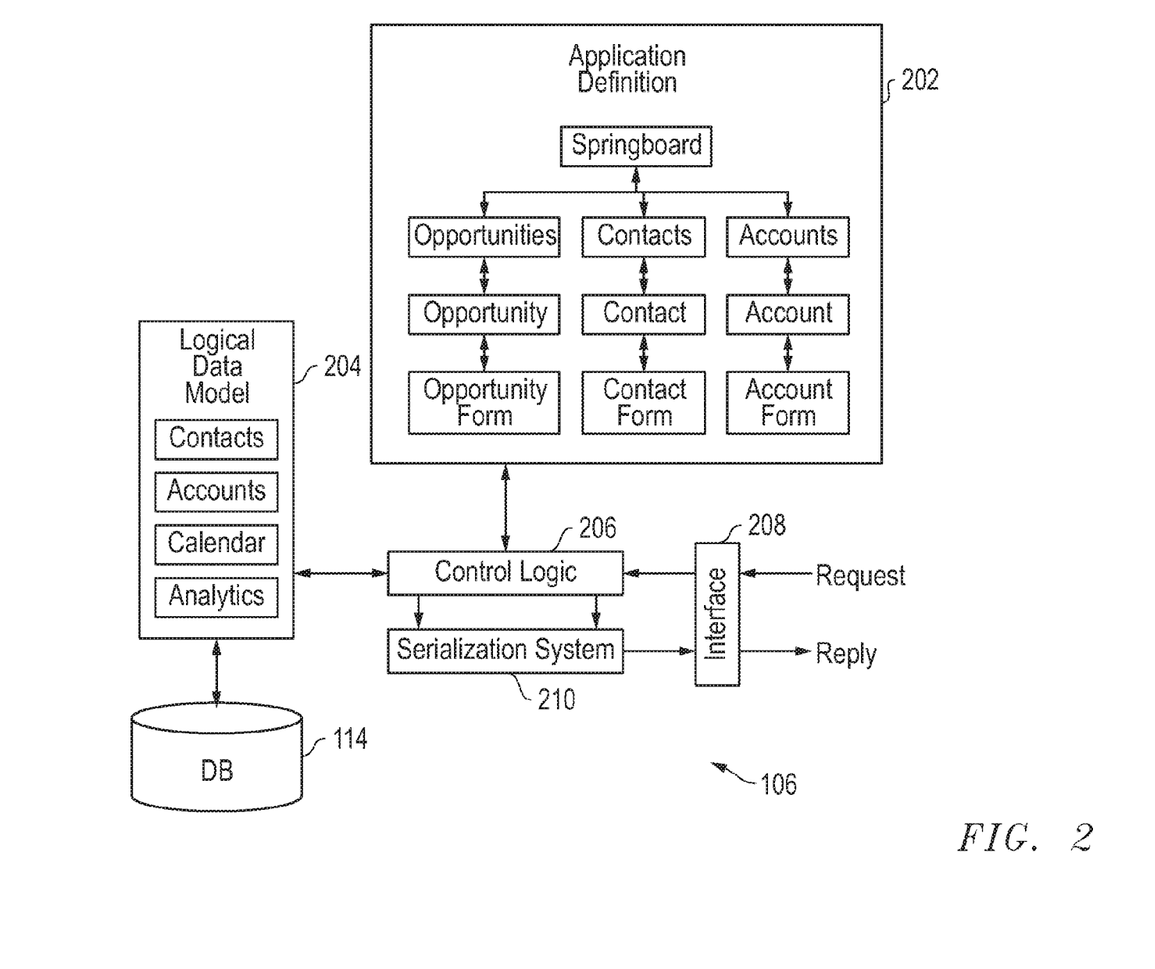
FIG. 2 graphically illustrates relevant components of an example server employed in FIG. 1.

With continuing reference to FIG. 1, FIG. 2 illustrates an example of server 106 from FIG. 1 with relevant components shown in block diagram form. Memory 202 stores an application definition for the CRM. The application definition includes page definitions, some of which are visually represented along with navigation flow relationships therebetween. Page definitions (also known as "views") form the basis of pages that are displayed by mobile devices 102 or 104. The application definition can be built using Java Server Faces (JSF) technology, it being understood the present invention should not be limited thereto. JSF provides standard, reusable components for creating pages that can be displayed on mobile devices. JSF provides useful, special tags to enhance page definitions. Each tag gives rise to an associated component. JSF can also be used to define page navigation within the application definition, map page components to a data model, etc. While page definitions run on server 106, they are displayed on mobile devices 102 or 104. Example page definitions are visually represented in memory 202. The "springboard" page definition can be used to render a page with icons arranged in a two-dimensional pattern. Each icon may represent a mini-application or high level business object within the logical data model. The "accounts," "opportunities," and "contacts" page definitions can be used to render pages with names or other information of accounts, opportunities, and contacts, respectively, in a list pattern. The "account," "opportunity," and "contact" page definitions can be used to render pages with data from an account, opportunity, and contact, respectively, in a form pattern. The "account form," "opportunity form," and "contact form" page definitions can be used to render pages with data from an account, opportunity, and contact, respectively, in a user editable form pattern. Other page definitions in memory 202 are contemplated.

Page definitions can be used to render logical data model 204 into a form suitable for interaction by a user of mobile device 102 or 104. Logical data model 204 manages the data of the application definition, responds to requests for information about its state (usually from a page definition), and responds to instructions to change state from control logic 206. In one sense, logical data model 204 provides access to business objects such as contacts, opportunities, analytics, etc. The logical data model 204 is both the data and the business/domain logic needed to manipulate the data of the application definition.

Control logic 206, which may take form in instructions executing on a processor, is in data communication with the application definition contained within memory 202 in addition to being in data communication with interface 208 and serialization system 210. Control logic 206 can accept data from a user via mobile device 102 or 104 and instruct the logical data model 204 to perform an action (e.g., update an opportunity) based on that data. Control logic 206 can also receive a page request from mobile device 102 or 104. The page request should directly or indirectly identify the serialization format (e.g., JSON or plist) that is needed for the corresponding reply. In response to receiving a page request from mobile device 102 or 104 via interface 208, control logic 206 may access the application definition in memory 202 to identify and retrieve the page definition, or relevant components thereof, which is needed to form the proper reply. The page definition retrieved from memory 202 may contain metadata that identifies data of the logical data model 204. Control logic 206 can make calls on business objects of logical data model 204 to retrieve the data identified by the metadata. The page definition can be merged or bound with data from model 204, the result of which is serialized and subsequently transmitted to the requesting mobile device in a reply.

Figure 3:
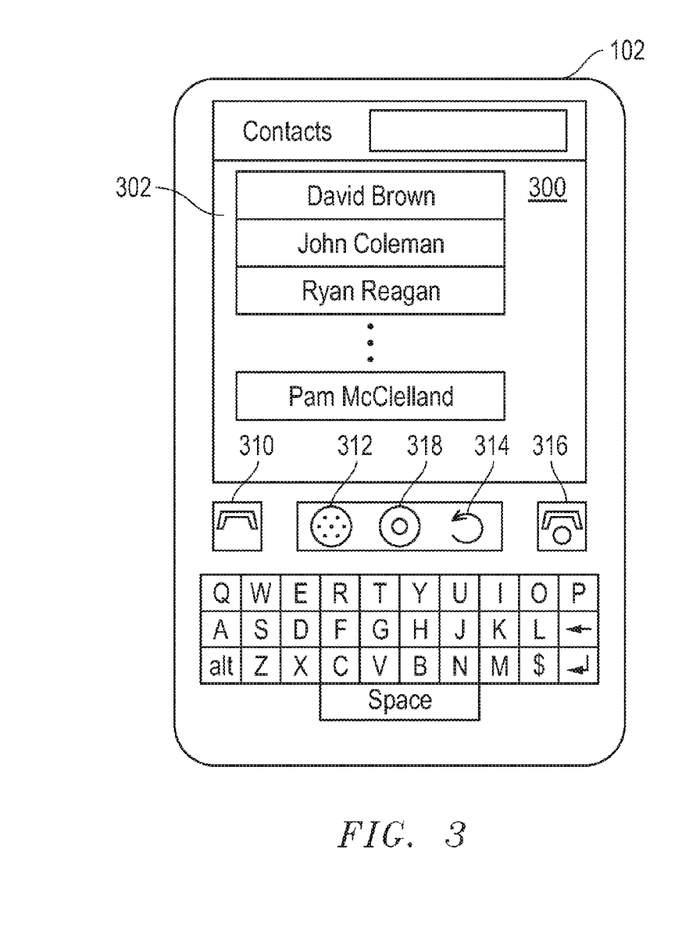
FIG. 3 graphically illustrates external components of an example mobile device employed in FIG. 1.
Figure 4:
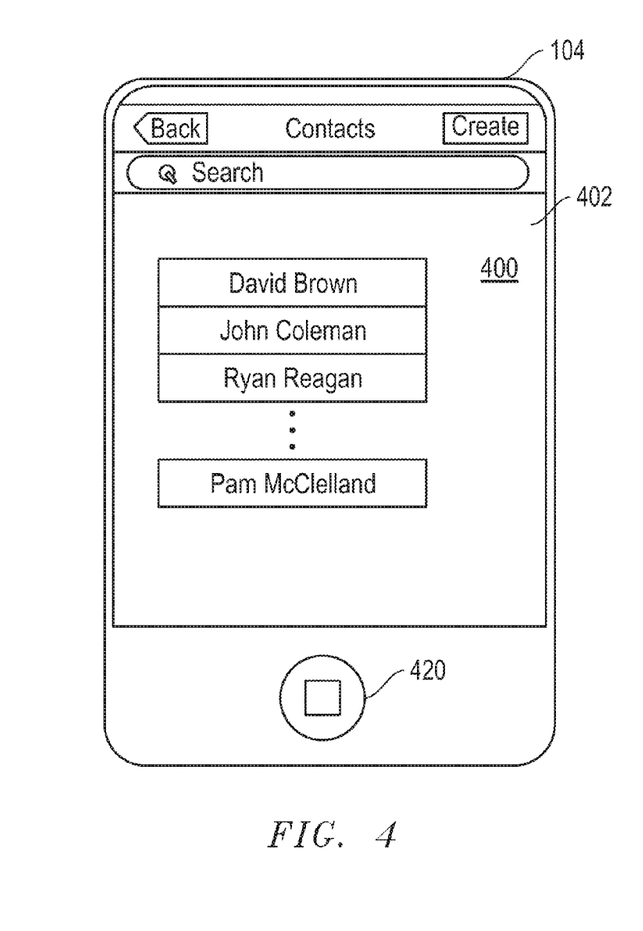
FIG. 4 graphically illustrates external components of an example mobile device employed in FIG. 1.

Serialization system 210 has the ability to serialize a reply in a format configured to optimize performance of mobile devices 102 and 104. For example, serialization system 210 may be able to generate a reply that has one serialization format (e.g., plist), which is optimal for mobile device 104, and serialization system 210 may be able to generate a reply that has another, different serialization format (e.g., JSON), which is optimal for mobile device 102. Ultimately, the requesting mobile device receives the reply, deserializers its content, and displays a corresponding page. FIGS. 3 and 4 illustrate example pages that are displayed by mobile devices 102 and 104, respectively.

With continuing reference to FIG. 2, FIGS. 3 and 4 illustrate relevant external features of mobile devices 102 and 104. Each of mobile devices 102 and 104, although different in design and operation, can implement common functions such as email, cell phone, etc. FIGS. 3 and 4 illustrate distinctions between mobile devices 102 and 104. Mobile device 102 includes a hard or physical keyboard, while mobile device 104 includes a soft keyboard (not shown). Mobile device 104 may include soft buttons displayed on a touch sensitive display screen. Mobile device 102 lacks a touch sensitive screen. Rather, mobile device 102 includes a trackball and multiple, dedicated physical buttons. Although different in many aspects, mobile devices 102 and 104 are sized to fit in the front or back pocket of a normal pair of adult sized pants, it being understood that the term mobile device should not be limited thereto.

With continuing reference to FIG. 2, mobile device 102 as shown in FIG. 3 includes a screen 302 that displays a "Contacts" page 300 provided by the CRM of server 106. In addition, mobile device 102 includes physical buttons 310-316, a trackball 318, and a physical keyboard 320. A trackball is a pointing device consisting of a ball held by a socket containing sensors to detect a rotation of the ball about two axes—like an upside-down mouse with an exposed protruding ball. The user rolls the ball with the thumb, fingers, or the palm of the hand to move a cursor across screen 302. When the curser reaches an active button or icon displayed on the screen 302, the user can activate the button or icon by depressing trackball 318. Another native feature of mobile device 102 is the display of a menu on screen 320 when the trackball is depressed.

In contrast, mobile device 104 of FIG. 4 lacks multiple, dedicated physical buttons and a physical keyboard. Rather, mobile device 104 has a single physical button 420 and a touch sensitive display screen 402 with active buttons or icons (e.g., Create or Back buttons) displayed therein. A user can activate a soft button or icon by simply by touching it. While screen 402 may display several active buttons or icons, mobile device 104 includes only one physical button 420. Although not shown, a soft keyboard can be displayed.

Figure 5:
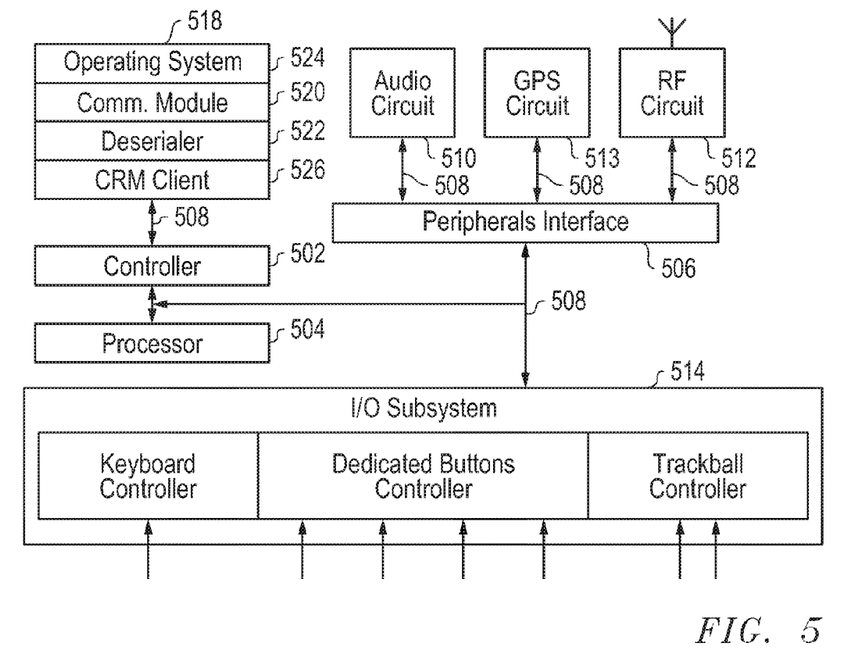
FIG. 5 graphically illustrates internal components of an example mobile device employed in FIG. 1.
Figure 6:
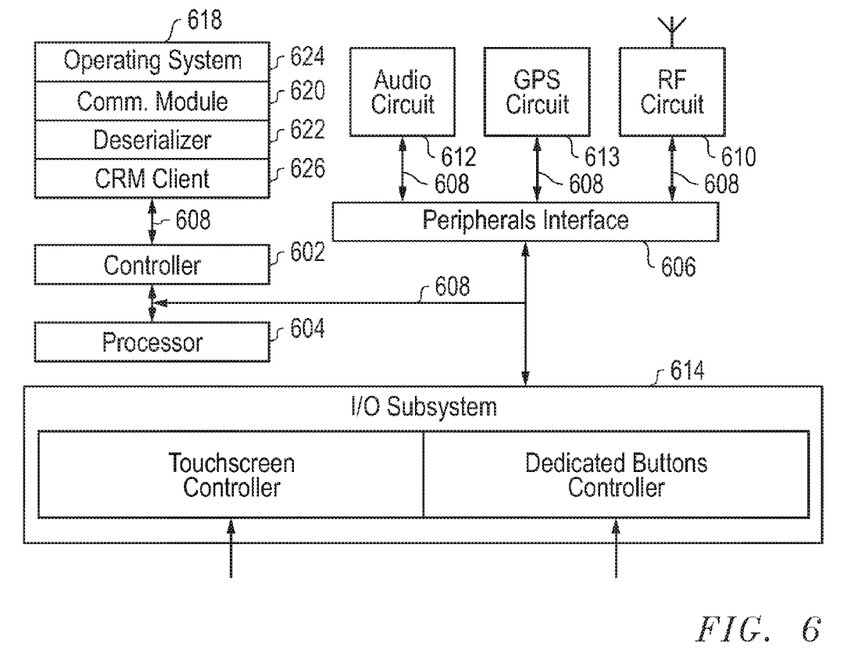
FIG. 6 graphically illustrates internal components of an example mobile device employed in FIG. 1.

FIGS. 5 and 6 illustrate relevant internal components of the mobile devices 102 and 104, respectively, in block diagram form. At first glance, mobile devices 102 and 104 contain similar components. However, corresponding components in mobile devices 102 and 103 can operate alone or in conjunction with each other in substantially different ways.

With continuing reference to FIG. 3, mobile device 102 of FIG. 5 includes a memory controller 502 coupled to a processor 504 and a peripherals interface 506. The various components of mobile device 102 may be coupled by one or more communication buses or signal lines 508. The peripherals interface 506 is coupled to radio frequency (RF) circuit 510, audio circuit 512, and global positioning system (GPS) circuit 513. The GPS circuit 513 supports a location determining capability and can provide the longitude and latitude of mobile device 102 upon request.

The peripherals interface 502 is coupled to an I/O subsystem 514 that contains various controllers that interact with other components of mobile device 102. I/O subsystem 514 includes a keyboard controller coupled to receive input from the physical keyboard 320. The trackball controller is coupled to receive input from the trackball 318. And dedicated buttons controllers receive respective inputs from dedicated buttons 310-316.

Memory controller 502 is coupled to memory 518, which may take form in one or more types of computer readable medium. Memory 518 stores several software components or modules including a communication module that provides communication procedures, which enable communication between mobile device 102 and server 106 via a wireless communication link 110A shown in FIG. 1. Memory 518 may also include a JSON deserializer 522, an operating system 524, and a set of applications including CRM client 526 as shown. Components in memory 518 may support email service, texting, mapping, etc. Other components in memory 518 may support email, texting, mapping, etc. The CRM client 526, as will be more fully described below, operates in conjunction with other modules (e.g., operating system 524, etc.) shown within FIG. 5 to render a page provided by server 106, create a request for a subsequent page, issue instructions to initiate functions such as email, cell phone, etc.

With continuing reference to FIG. 4, mobile device 104 of FIG. 6 includes a memory controller 602 coupled to a processor 604 and a peripherals interface 606. Like mobile device 102, the various components of mobile device 104 may be coupled by one or more communication buses or signal lines 608. The peripherals interface 606 is coupled to RF circuit 610, audio circuit 612, and global positioning system (GPS) circuit 613, which supports location determining capabilities.

The peripherals interface 602 is coupled to an I/O subsystem 614 that contains various controllers that interact with other components of mobile device 104. I/O subsystem 614 includes a touch screen controller that is coupled to the touch sensitive display screen 404 shown in FIG. 4. The touch screen controller may detect contact and any movement or break thereof.

Memory controller 602 is coupled to memory 618, which may take form in one or more types of computer readable medium. Memory 618 stores several software components or modules including a communication module that provides communication procedures, which enable communication between mobile device 104 and server 106 via wireless communication link 110B shown in FIG. 1. Memory 618 may also include a plist deserializer 622, an operating system 624, and a set of applications including CRM client 626 as shown. Other components in memory 618 may support email service, texting, etc. The CRM client 626, as will be more fully described below, operates in conjunction with modules shown within FIG. 6 to display a page provided by server 106, create a request for a subsequent page, issue instructions to initiate functions such as email, cell phone, mapping, etc.

CRM client 626 of mobile device 104 is substantially different than the CRM client 526 of mobile device 102. The differences between clients 526 and 626 enable the same page from the CRM to be displayed with a look and feel that is native to mobile devices 102 and 104, respectively, and similar to the look and feel of pages displayed by other applications in memory 518 and 618, respectively. Look and feel is a term used to describe aspects of page design, including elements such as colors, shapes, layout, and typefaces (the "look"), as well as the behavior of dynamic elements such as buttons, boxes, and menus (the "feel"). JSON deserializer 522 operates in conjunction with CRM client 526, controller 508, processor 504, etc. to render pages for display. Likewise, plist deserializer 622 operates in conjunction with operating system 625, CRM client 626, etc., to render pages for display.

With continuing reference to FIGS. 2-4, mobile devices 102 and 104 display pages on their respective screens in accordance with serialized replies, which consist of page definitions merged with model data. The page definitions of the CRM do not take into account the look and feel of mobile devices including mobile devices 102 and 104. In other words, the page definitions are independent of the look and feel of mobile devices 102 and 104. The corresponding Contacts pages (see FIGS. 3 and 4) displayed on mobile devices 102 and 104 are not identical, even though they are created from the same page definition and with the same data from the logical data model. Many of the differences in the corresponding pages may account for differences in the native look and feel of mobile devices 102 and 104. For example, page 400 contains soft "Back" and "Create" buttons. Mobile device 104 redisplays an immediately prior page when the Back button is activated. Mobile device 104 displays another page that enables the user to create a new contact when the Create button is activated. Users of mobile device 104 should be more familiar with the Back and Create buttons and their respective functions if they have previously used other applications that employ the same Back and Create buttons. Mobile device 102 can implement the same back and create functions, but these functions are activated in a substantially different way when compared to mobile device 104. Instead of a soft "Back" button, mobile device 102 has a physical "Back" button 314. Mobile device 102 can also implement the function of creating a new entry, but the create function is implemented when the user selects an appropriate menu option after a menu is displayed by mobile device 102 in response to the user depressing trackball 318.

With continuing references to FIGS. 5 and 6, mobile devices 102 and 104 include deserializers 522 and 622 with memories 518 and 618, respectively. These serializers are distinct from each other. In the illustrated example, deserializer 522 is configured to deserialize JSON formatted replies from the CRM, while deserializer 622 is configured to deserialize plist formatted replies from the CRM. It is noted that deserializers 522 and 622 are shown separate and apart from CRM clients 526 and 626. In another embodiment, deserializers 522 and 622 may be part of CRM clients 526 and 626, respectively.

The mobile device 102 shown in FIG. 5 is not limited to use of JSON deserializer 522. Indeed, plist deserializer 622 of FIG. 6 could be employed in mobile device 102. Likewise, the mobile device 104 shown in FIG. 6 is not limited to use of plist deserializer 622. Rather, deserializer 622 can be replaced with the JSON deserializer 522 of FIG. 5. However, JSON deserializer 522 is selected to optimize performance in mobile device 102, and plist deserializer 622 is selected to optimize performance in mobile device 104.

Pages are rendered for display on mobile devices 102 and 106 in response to user request. The time between requesting a page and a subsequent display thereof is referred to as the response time. Short response times are favored by users. There are many factors that affect response time such as the time it takes for serialization system 210 to serialize a reply before it is transmitted to mobile device 102 or 104, the time it takes to transmit the reply via a wireless communication link, the time it takes for deserializer 522 or 622 to deserialize content of the reply, etc. The system shown in the Figures should be designed to minimize the response time for each mobile device 102 or 104.

The time needed to serialize a reply into one format may be less than the time it takes to serialize the same reply into another format. However, the size of a reply after serialization into the first format may be greater when compared to the size of the same reply after serialization into the second format, which in turn affects the time needed to transmit the reply to the requesting mobile device. Further, deserialization of a reply in the first format may require more time than deserialization of the same reply in the second format. Moreover, the time needed for deserialization by different deserializers (e.g., JSON deserializer 522 and plist deserializer 622) may depend upon the hardware and/or software components that cooperate with the deserializers.

In the illustrated embodiments, JSON deserializer 522 was selected to optimize the response time for mobile device 102, while plist deserializer was selected to optimize the response time for mobile device 104. If plist deserializer 622 was employed in mobile device 102, users of mobile device 102 would probably experience a greater response time, and if JSON deserializer 522 was employed in mobile device 104, users of mobile device 104 would probably experience a longer response time.

As noted above, a single application definition is provided in memory 202, which can operate without regard to mobile device. The same page definitions can be used to create pages on mobile device 102 or 104 even though, for example, mobile devices 102 and 104 employ different deserializers 522 and 622. To accommodate differences within the mobile devices 102 and 104, the application definition is configured to be serialization independent; the same page definitions can be serialized into different formats by serialization system 210. To accommodate serialization into different formats without losing data during the process, the page definitions are developed with an adherence to core object structures. In one embodiment, these core object structures are map, array, and property. The page definitions should be limited to these three structures. A map can be seen as an unordered list of entries, each of which has a unique identification or name within the list. An array can be seen as an ordered list of entries, each of which can be accessed by an index, but entries in an array can identified with common names. A property can be seen as a construct consisting of a name/value pair. This can be a simple name/value or a complex name/value. The property construct can be used to fill out the shape of an object. A 'cat' object, for example, could have a 'color' property, a 'paws' property, a 'nose' property, etc. The 'color' property could have a simple value 'brown', 'paws' could have a complex value of 4 paws, and 'nose' could have a complex value of 1 nose. Complex property values can also have properties. For example a paw value from the 'paws' property could have a 'color' property, a 'claws' property, a 'size' property, etc. An example of a simple name/value is <list title="Contacts"/> where 'title' is the name and 'Contacts' is the value. Another example of a simple name/value is <inputNumber maximum="10"/> where 'maximum' is the name and '10' is the value. An example of a complex property is <property name="query"><simpleQuery . . . /></property> where 'query' is the name and '<simpleQuery . . . />' is the value. Another example of a complex property is <propertyArray name="commands"><command id="create" . . . /><command id="edit" . . . /></propertyArray> where "commands" is name and both <command id="create" . . . /><command id="edit" . . . /> are the value.

In one embodiment, each tag in a page definition is designated as a map, array, or property. If a tag is not a property or array, then it is a map. Without the designations, errors may be introduced into the resulting serializations. Below is a portion of an example page definition that can be employed to create the Contacts page shown within FIGS. 3 and 4

```
<LIST TITLE="Contacts" [Property]> [Map]
    <ENTRIES> [Array]
        <ENTRY>   [Map]
            <ITEMS> [Array]
                <ITEM Value= "Fullname" [Property]> [Map]
            </ITEMS>
        </ENTRY>
    </ENTRIES>
    <QUERY/> [Property]
    <COMMANDS> [Property]
        <BACK/> [Property]
        <PRIMARY> [Array]
            <CREATE/> [Map]
        </PRIMARY>
    </COMMANDS>
</LIST>
```

As seen, each tag of the example is designated as either a Map, Array, or Property. These designations are used by the serialization system 210 during serialization to produce different results depending on the mode of serialization. To illustrate, below is a portion of another example page definition that may be included in the application definition of memory 202 and which relates to an Opportunity page that can be displayed on mobile device 102 or 104.

```
<pageList title="Opportunity" [Property]> [Map]
    <propertyArray name="commands"> [Array]
        <property name="primary"> [Property]
            <command text="Create" [Property] ...> [Map]
                <propertyValue name="disabled" value="false"/>
            [Property]
            </command>
        </property>
        . . .
    </propertyArray>
    . . .
</pageList>
```

The foregoing can be merged with model data and serialized into JSON or plist formatted replies by serialization system 206. Serialization into the plist format and JSON formats of the foregoing results in the following:

plist Formatted

```
<dict>
    <key>type</key>
    <string>pageList</string>
    <key>title</key>
    <string>Opportunity</string>
    <key>commands</key>
    <array>
        <dict>
            <key>type</key>
            <string>primary</string>
            <key>text</key>
            <string>Create</string>
            <key>disabled</key>
            <false/>
        </dict>
        . . .
    </array>
```

-continued

```
    ...
</dict>
```

JSON Formatted

```
{
    type="pageList";
    title="Opportunity";
    commands=
    [
      type="primary";
      test="Create";
      disabled=false;
    ]
}
```

The resulting plist and JSON serializations are substantially different. Because of the map, array, and property designations, one application definition can be developed to provide pages to mobile devices of different design and/or operation.

Figure 7:
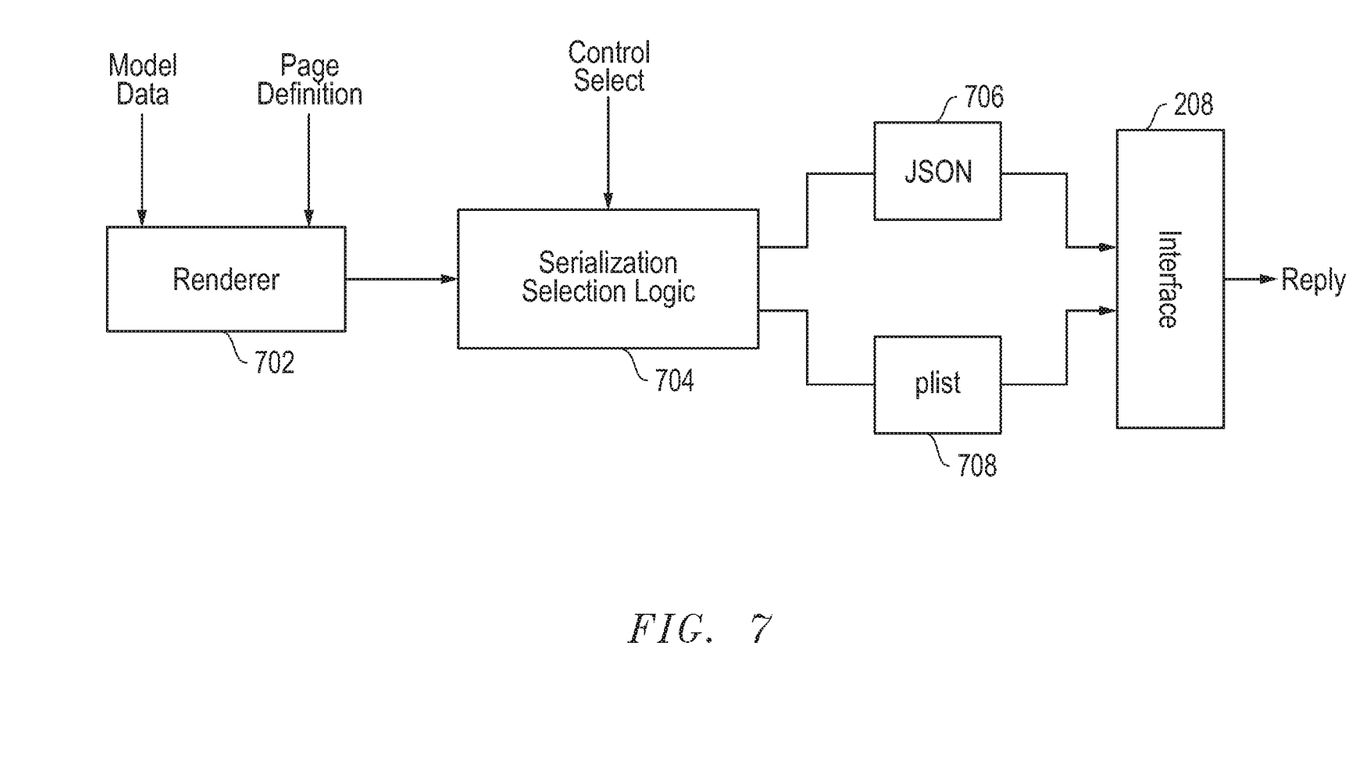
FIG. 7 illustrates an example serialization system employed in FIG. 1.

With continuing reference to FIG. 1, FIG. 7 illustrates relevant components of the serialization system 210. Serialization system 210 includes a renderer 702, which may take form in instructions executing on one or more processors. Renderer 702 is configured to receive model data from logical data model 204 and page definitions from memory 202 via control logic 206. Renderer is configured to generate a reply to a request from mobile device 102 or 104 by binding model data with a page definition. The reply is subsequently switched to response writer 706 or 708 via serialization selection logic 704 according to a signal received from control logic 206. Control logic 206 determines the signal directly or indirectly based on information in the corresponding request. If the request indicates the reply is destined for a JSON enabled mobile device, the control logic will instruct serialization selection logic 704 to send the reply to JSON response writer 706. Otherwise, the reply is sent to plist response writer 708. Response writer 706 or 708 serializes the reply into the JSON or plist format, respectively. The tag designations Map, Array, and Property are used by the response writers 706 and 708 to properly serialize the tags of the reply in order to avoid losing data.

Figure 8:
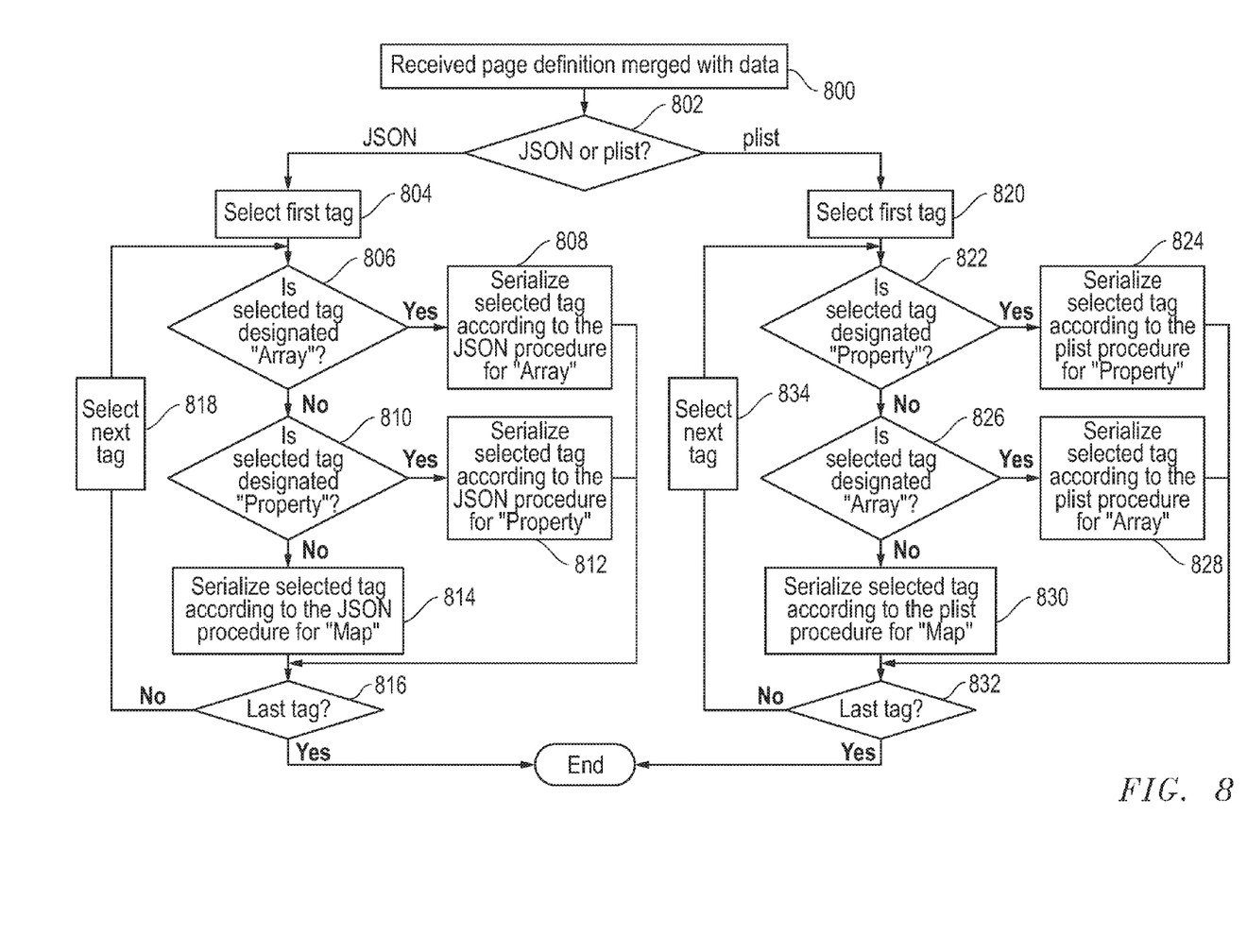
FIG. 8 illustrates relevant aspects a process implemented by the example serialization system shown in FIG. 7.

FIG. 8 illustrates relevant aspects of a process implemented by serialization system 210 shown within FIG. 7. With continuing reference to FIG. 7, the process in FIG. 8 initiates when the serialization selection logic 704 receives the reply generated by renderer 702. In step 802 serialization selection logic switches the reply to the JSON response writer 706 or plist response writer 708 based on the signal received from control logic 206.

If the reply is sent by serialization selection logic 704 to a JSON response writer 706, steps 804-818 are implemented by response writer 706. Alternatively, if the reply is sent to plist response writer 708, steps 820-834 are implemented by response writer 708.

When the reply is sent to JSON response writer 706, the first tag of the reply is selected as shown in step 804. In step 806, the JSON response writer 706 determines whether the selected tag is designated as "array." If it is, JSON response writer 706 serializes the selected tag according to the procedure for serializing tags designated as array as shown in step 808. During serialization, the JSON response writer designates an array by including a '[' at the beginning of the array and a ']' at the end of the array. Anything within the open and close bracket are considered items in the array. If the tag is not designated array, the process proceeds to step 810 where the JSON response writer 706 determines whether the selected tag is designated as "property." If it is, the selected tag is serialized according the response writer's procedure for serializing property tags as shown in step 812. During serialization, the JSON response writer designates a property by including its name and value separated by '='. The end of the value is signified by a ';'. Values can be simple for example color='red'; or complex for example size={width=5; height=10};. If the selected tag is not designated array or property, the response writer 706 presumes the selected tag is designated as "map," and accordingly response writer 706 serializes the selected tag in accordance with the procedure for serializing map tags as shown in step 814. During serialization, the JSON response writer designates a map by including a '{' at the beginning of the map and a '}' at the end of the map. Anything within the open and close bracket are considered entries in the map. In step 816, the JSON response writer 706 determines whether the selected tag is the last tag of the reply. If not, steps 806-814 are repeated with the next tag. Otherwise, the process ends.

When the reply is sent to plist response writer 708, the first tag of the reply is selected as shown in step 820. In step 822, the plist response writer 708 determines whether the selected tag is designated as "array." If it is, plist response writer 708 serializes the selected tag according to the procedure for serializing tags designated as array as shown in step 824. During serialization, the plist response writer designates an array by including an '<array>' node at the beginning of the array and a '/array>' at the end of the array. Anything within the open and close bracket are considered items in the array. If the tag is not designated array, the process proceeds to step 826 where the plist response writer 708 determines whether the selected tag is designated as "property." If it is, the selected tag is serialized according the response writer's procedure for serializing property tags as shown in step 828. During serialization, the plist response writer designates a property by including its name and value as a pair of nodes. The name is included as a value of a 'key' node for example <key>commands</key> and the value in appropriate value node. Values can be simple, e.g., <key>color</key> <string>red</string> or complex, e.g., <key>size</key><dict><key>width</key><real>5</real><key>height</key><real>10</real>. If the selected tag is not designated array or property, the response writer 708 presumes the selected tag is designated as "map," and accordingly response writer 708 serializes the selected tag in accordance with the procedure for serializing map tags as shown in step 830. During serialization, the plist response writer plist designates a map by including a including an '<dict>' node at the beginning of the array and a '</dict>' at the end of the map. Anything within the open and close bracket are considered entries in the map. In step 832, the plist response writer 708 determines whether the selected tag is the last tag of the reply. If not, steps 822-832 are repeated with the next tag. Otherwise, the process ends.

Figure 9:
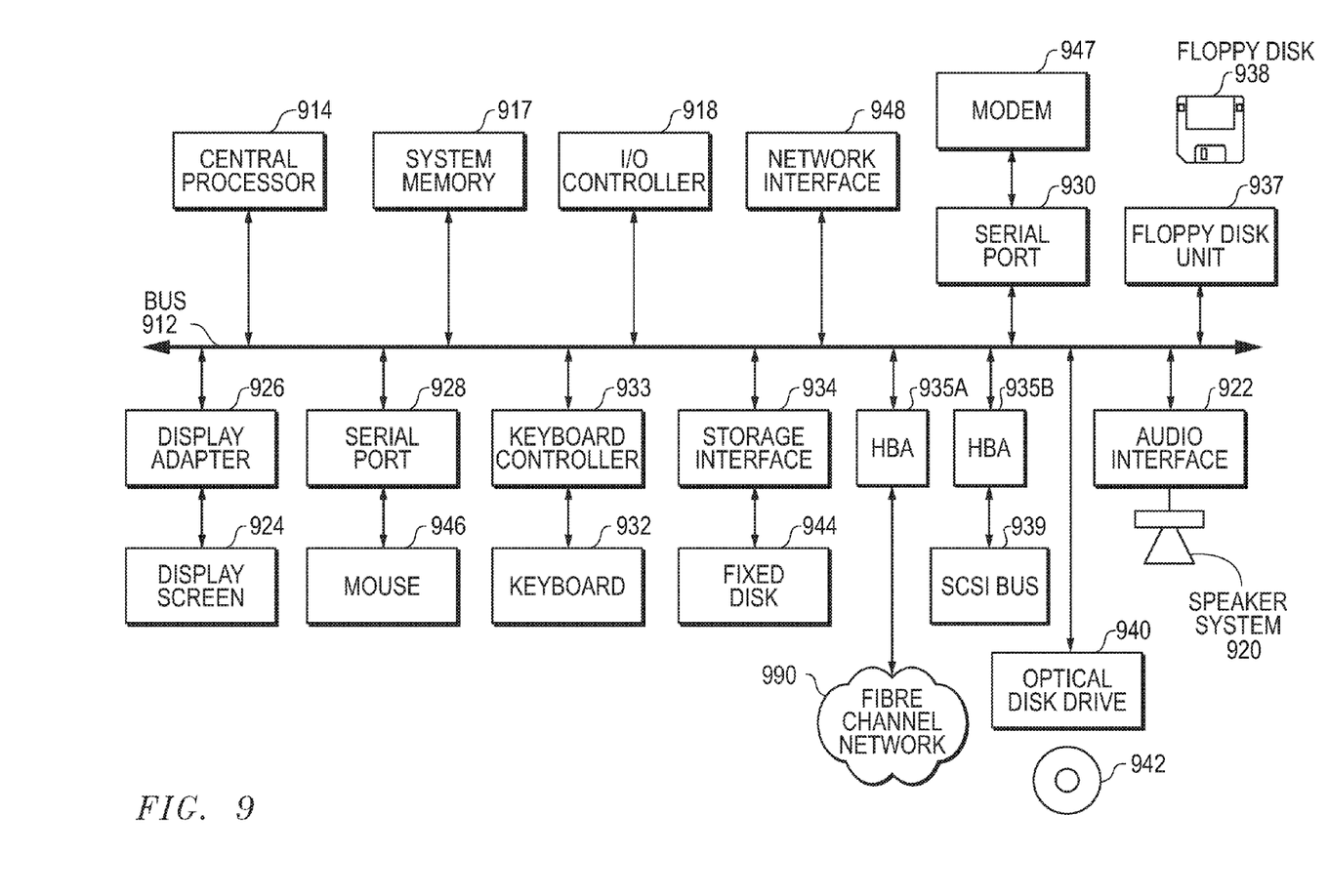
FIG. 9 is a block diagram of an example computer system that may be employed in the system of FIG. 1 or 2.

FIG. 9 depicts a block diagram of a computer system 910 suitable for implementing the present disclosure. Computer system 910 may be illustrative of various computer systems (e.g., servers or clients) shown in FIGS. 1 and 2. Computer system 910 includes a bus 912 which interconnects major subsystems of computer system 910, such as a central processor 914, a system memory 917 (typically RAM, but which may also include ROM, flash RAM, or the like), an input/output controller 918, an external audio device, such as a speaker system 920 via an audio output interface 922, an external device, such as a display screen 924 via display adapter 926, serial ports 928 and 930, a keyboard 932 (interfaced with a keyboard controller 933), a storage interface 934, a floppy disk drive 937 operative to receive a floppy disk 938, a host bus adapter (HBA) interface card 935A operative to connect with a Fibre Channel network 990, a host bus adapter (HBA) interface card 935B operative to connect to a SCSI bus 939, and an optical disk drive 940 operative to receive an optical disk 942. Also included are a mouse 946 (or other point-and-click device, coupled to bus 912 via serial port 928), a modem 947 (coupled to bus 912 via serial port 930), and a network interface 948 (coupled directly to bus 912).

Bus 912 allows data communication between central processor 914 and system memory 917, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 910 are generally stored on and accessed via a computer readable medium, such as a hard disk drive (e.g., fixed disk 944), an optical drive (e.g., optical drive 940), a floppy disk unit 937, or other storage medium. Additionally, applications can be in the form of electronic signals modulated in accordance with the application and data communication technology when accessed via network modem 947 or interface 948.

Storage interface 934, as with the other storage interfaces of computer system 910, can connect to a standard computer readable medium for storage and/or retrieval of information, such as a fixed disk drive 944. Fixed disk drive 944 may be a part of computer system 910 or may be separate and accessed through other interface systems. Modem 947 may provide a direct connection to a remote server via a telephone link or to the Internet via an interne service provider (ISP). Network interface 948 may provide a direct connection to a remote server via a direct network link to the Internet via a POP (point of presence). Network interface 948 may provide such connection using wireless techniques, including digital cellular telephone connection, Cellular Digital Packet Data (CDPD) connection, digital satellite data connection or the like.

The operation of a computer system such as that shown in FIG. 9 is readily known in the art and is not discussed in detail in this application. Code for implementing a CRM can be stored in computer-readable storage media such as one or more of system memory 917, fixed disk 944, optical disk 942, or floppy disk 938. Memory 920 is also used for storing temporary variables or other intermediate information during the execution of instructions by the processor 910. The operating system provided on computer system 910 may be MS-DOS®, MS-WINDOWS®, OS/2®, UNIX®, Linux®, or another known operating system.

Although the invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   in response to receiving a first request from a first device configured to receive replies that are serialized in a first format, determining a first reply by a CRM application executing on a server device comprising at least one processor, wherein the CRM application comprises an application definition;
   generating the first reply as a function of a portion of the application definition, wherein the portion of the application definition comprises a page definition used to render a page with icons arranged in a two-dimensional pattern, data in a list pattern, or data in a form pattern;
   in response to receiving a second request from a second device configured to receive replies that are serialized in a second format that is distinct from the first format, determining a second reply by the CRM application;
   generating the second reply as a function of the portion of the application definition;
   wherein the portion of the application definition comprises a plurality of tags and a plurality of tag designators, wherein the plurality of tag designators indicates whether the plurality of tags, respectively, are designated as one of a first type of tag, a second type of tag, and a third type of tag;
   wherein generating the first reply comprises:
      serializing a first tag of the page definition in accordance with a first process when the first tag is designated by a first tag designator as the first type of tag;
      serializing the first tag in accordance with a second process when the first tag is designated by the first tag designator as the second type of tag;
      serializing the first tag in accordance with a third process when the first tag is designated by the first tag designator as the third type of tag;
   wherein generating the second reply comprises:
      serializing the first tag in accordance with a fourth process when the first tag is designated by the first tag designator as the first type of tag;
      serializing the first tag in accordance with a fifth process when the first tag is designated by the first tag designator as the second type of tag; serializing the first tag in accordance with a sixth process when the first tag is designated by the first tag designator as the third type of tag.

2. The method of claim 1:
   wherein the first request comprises data that directly or indirectly indicates that the first device is configured to deserialize replies in a first serialization format;
   wherein the second request comprises data that directly or indirectly indicates that the second device is configured to deserialize replies in a second serialization format.

3. The method of claim 1 wherein the first reply lacks the plurality of tag designators, and wherein the second reply lacks the plurality of tag designators.

4. The method of claim 1 wherein the first format is JSON, and wherein the second format is plist.

5. The method of claim 1:
   wherein the first reply is generated as a function of first data;
   wherein the second reply is generated as a function of the first data.

6. The method of claim 5 further comprising:
   the first device deserializing the first reply in response to the first device receiving the first reply;
   the first device displaying a first page in response to the first device deserializing the first reply;
   the second device deserializing the second reply in response to the second device receiving the second reply;
   the second device displaying a second page in response to the second device deserializing the second reply;

wherein the first and second pages are visually distinctive.

7. The method of claim 5 further comprising:
the first device deserializing the first reply in response to the first device receiving the first reply;
the first device displaying a first page in response to the first device deserializing the first reply;
wherein the first page comprises visual representations of the first data and a visual representation of a first component defined in the portion of the application definition.

8. The method of claim 7 further comprising:
the second device deserializing the second reply in response to the second device receiving the second reply;
the second device displaying a second page in response to the second device deserializing the second reply;
wherein the second page comprises visual representations of the first data but not a visual representation of the first component defined in the portion of the application definition.

9. A non-transitory computer readable medium comprising instructions executable by a computer system, wherein the computer system implements a method in response to executing the instructions, the method comprising:
in response to receiving a first request from a first device configured to receive replies that are serialized in a first format, determining a first reply by a CRM application executing on a server device comprising at least one processor, wherein the CRM application comprises an application definition;
generating the first reply as a function of a portion of the application definition, wherein the portion of the application definition comprises a page definition used to render a page with icons arranged in a two-dimensional pattern, data in a list pattern, or data in a form pattern;
in response to receiving a second request from a second device configured to receive replies that are serialized in a second format that is distinct from the first format, determining a second reply by the CRM application;
generating the second reply as a function of the portion of the application definition;
wherein the portion of the application definition comprises a plurality of tags and a plurality of tag designators, wherein the plurality of tag designators indicates whether the plurality of tags, respectively, are designated as one of a first type of tag, a second type of tag, and a third type of tag;
wherein generating the first reply comprises:
serializing a first tag of the page definition in accordance with a first process when the first tag is designated by a first tag designator as the first type of tag;
serializing the first tag in accordance with a second process when the first tag is designated by the first tag designator as the second type of tag;
serializing the first tag in accordance with a third process when the first tag is designated by the first tag designator as the third type of tag;
wherein generating the second reply comprises:
serializing the first tag in accordance with a fourth process when the first tag is designated by the first tag designator as the first type of tag;
serializing the first tag in accordance with a fifth process when the first tag is designated by the first tag designator as the second type of tag; serializing the first tag in accordance with a sixth process when the first tag is designated by the first tag designator as the third type of tag.

10. The non-transitory computer readable medium of claim 9:
wherein the first reply is generated as a function of first data;
wherein the second reply is generated as a function of the first data.

11. The non-transitory computer readable medium of claim 9:
wherein the first request comprises data that directly or indirectly indicates that the first device is configured to deserialize replies in a first serialization format;
wherein the second request comprises data that directly or indirectly indicates that the second device is configured to deserialize replies in a second serialization format.

12. A method comprising:
transmitting instructions to a server device for storage therein, wherein the server device is configured to implement a method in response to executing the instructions, the method comprising:
in response to receiving a first request from a first device configured to receive replies that are serialized in a first format, determining a first reply by a CRM application executing on the server device comprising at least one processor, wherein the CRM application comprises an application definition;
generating the first reply as a function of a portion of the application definition, wherein the portion of the application definition comprises a page definition used to render a page with icons arranged in a two-dimensional pattern, data in a list pattern, or data in a form pattern;
in response to receiving a second request from a second device configured to receive replies that are serialized in a second format that is distinct from the first format, determining a second reply by the CRM application;
generating the second reply as a function of the portion of the application definition;
wherein the portion of the application definition comprises a plurality of tags and a plurality of tag designators, wherein the plurality of tag designators indicates whether the plurality of tags, respectively, are designated as one of a first type of tag, a second type of tag, and a third type of tag;
wherein generating the first reply comprises:
serializing a first tag of the page definition in accordance with a first process when the first tag is designated by a first tag designator as the first type of tag;
serializing the first tag in accordance with a second process when the first tag is designated by the first tag designator as the second type of tag;
serializing the first tag in accordance with a third process when the first tag is designated by the first tag designator as the third type of tag;
wherein generating the second reply comprises:
serializing the first tag in accordance with a fourth process when the first tag is designated by the first tag designator as the first type of tag;
serializing the first tag in accordance with a fifth process when the first tag is designated by the first tag designator as the second type of tag; serializing the first tag in accordance with a sixth process when the first tag is designated by the first tag designator as the third type of tag.

* * * * *

UNITED STATES PATENT AND TRADEMARK OFFICE
CERTIFICATE OF CORRECTION

PATENT NO. : 9,026,583 B2  
APPLICATION NO. : 13/235729  
DATED : May 5, 2015  
INVENTOR(S) : Carter et al.

Page 1 of 1

It is certified that error appears in the above-identified patent and that said Letters Patent is hereby corrected as shown below:

In the specification

Column 8, line 8, delete "and 4" and insert -- and 4. --, therefor.

Column 10, line 31, delete "'/array>'" and insert -- '</array>' --, therefor.

Signed and Sealed this  
Ninth Day of February, 2016

Michelle K. Lee  
*Director of the United States Patent and Trademark Office*